March 12, 1929.  J. A. JACOBS  1,705,119
BUMPER
Filed June 4, 1928

INVENTOR.
Joseph A. Jacobs.
BY Barlow & Barlow
ATTORNEYS.

Patented Mar. 12, 1929.

1,705,119

UNITED STATES PATENT OFFICE.

JOSEPH A. JACOBS, OF PROVIDENCE, RHODE ISLAND.

BUMPER.

Application filed June 4, 1928. Serial No. 282,544.

This invention relates to an improved construction of bumper for vehicles; and has for its object to provide a bumper of this character having pivotally mounted end members adapted to swing in a direction away from the vehicle if caught while passing another vehicle or object so as to prevent injury to the parts engaged, the end member being so mounted as to resist movement from its normal position towards the vehicle and spring means being also provided for returning the member to normal position after having been moved from that position.

With these and other objects in view, the invention consists of certain novel features of construction, as will be more fully described, and particularly pointed out in the appended claims.

In the accompanying drawings:
Fig. 1 is a top view of a portion of a chassis of a motor vehicle showing my improved bumper as attached to the forward end thereof and having pivoted end members.

Fig. 2 is a front view of the bumper showing the end members as pivoted to the cross bars of the bumper.

Figure 1:
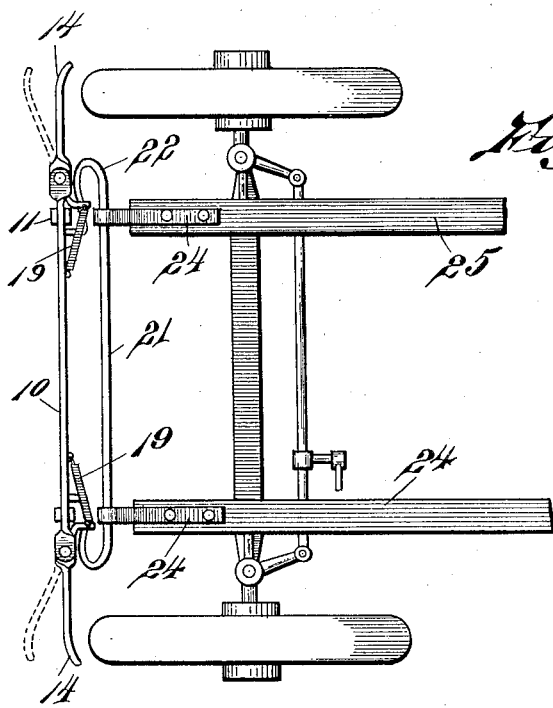
Figure 5:
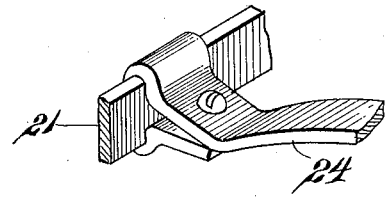
Figure 2:
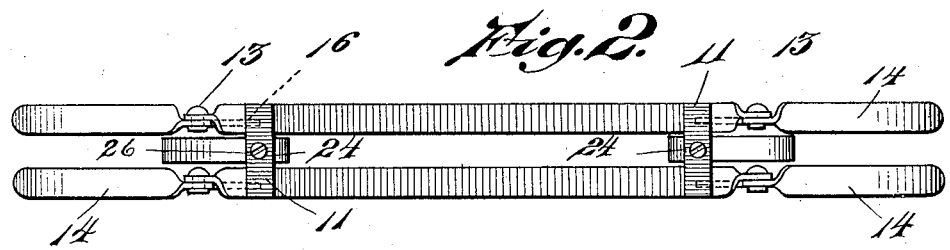
Figure 3:
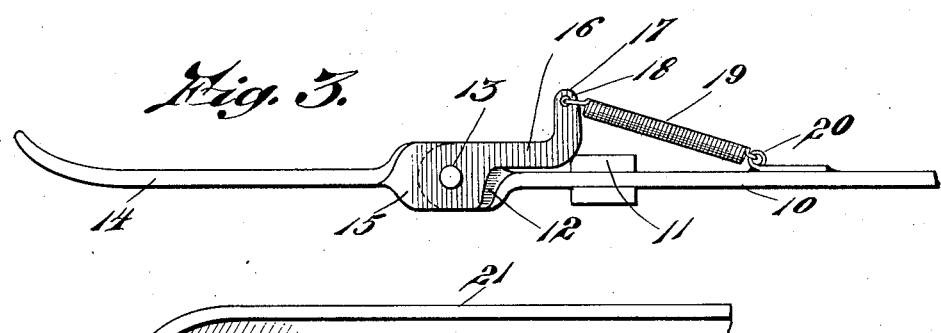
Fig. 3 is an edge view illustrating both the ends of the cross bar and a portion of the end member as being twisted to lie flat one upon the other to swing in a horizontal plane.
Figure 4:
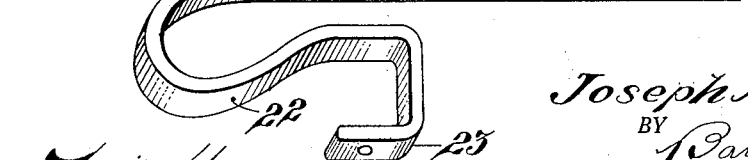
Fig. 4 is a perspective view illustrating one end portion of the resilient member of the bumper which is connected to the cross rods.

Fig. 5 is a perspective view illustrating the attaching members for the bumper as clamped to the resilient cross member.
It is found in practice in the usual bumpers for automobiles, which are employed either for protecting the front or rear ends of a vehicle, that often the extending end portion of the bumper is caught in the fender of a passing car or against some other object and is likely to either rip the bumper from its position or tear that part of the other car engaged by it; and to obviate this objectionable feature of the usual bumper, I have pivoted the end portion of the bumper so that it will yield and swing in a direction away from the car to which it is attached and a spring being provided for promptly returning the yielding member to its normal position ready to perform its protecting function; and the following is a detailed description of the present embodiment of my invention and showing one arrangement of parts by which these advantageous results may be accomplished:—

With reference to the drawings, 10 designates a bumper formed of a pair of cross bars connected together by clamps 11 in parallel spaced relation to extend across either the front or the rear of the vehicle, the ends of these bars being each twisted as at 12 to lie in a plane at right angles to the body of the bar and this twisted portion is pierced to receive a vertically disposed pivot pin 13.

End members 14 preferably of the same general character as the body of the cross bar are arranged to extend a substantial distance beyond the end of the cross bar and the inner portion of these extending members is also twisted as at 15, to provide a portion which lies in a horizontal plane or at a plane at right angles to that of the body of the member.

This twisted portion is arranged to lie flat against the similarly twisted portion 15 of the cross bar and is also pierced to receive the pivot pin 13 which passes thru both; this end member is provided with an inwardly extending neck portion 16 which is arranged to overlie the clamp 11 and rest against the same to provide a stop for preventing the end member from being swung inwardly towards the vehicle and the extremity of this neck portion is turned inwardly or at substantially right angles to the body and is pierced as at 18 to receive one end of the coiled spring 19, the opposite end of this spring being attached to an eye 20 fixed to the bar 10, by which construction this end member is permitted to swing on the pivot pin in a direction away from the vehicle and is promptly returned to its normal position against the stop 11 by the action of the spring 19.

In some instances, I provide a resilient cross member 21 which is bent into gooseneck form 22 at its opposite ends, the extremity 23 of this member being arranged to extend between the clamps 11 on the cross bar and are retained therein by a clamp bolt 26, whereby this cross member permits the whole bumper to yield to some extent and absorb a portion of a heavy shock or hard blow.

In attaching this bumper to the vehicle, I preferably engage this cross member 21 by clamping arms 24, the free ends of which may be bolted to the ends of the frame members 25.

My improved bumper is very strong and durable and by setting a right-angled twist in the end members a bearing and pivoting face is provided and also this twist serves to strengthen or stiffen the material and by the use of these pivoted ends damage is very often prevented both to the bumper and to an adjacent vehicle.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A bumper for attachment to the end of a vehicle, comprising a sheet metal cross bar and a separate end member secured thereto, the end portions of the bar being twisted to lie in a plane at right angles to the body of the bar to present horizontal surfaces thru which the member is pivoted to the bar to swing in a horizontal plane away from the vehicle, a stop to prevent the member from swinging in one direction beyond working position, and a spring for swinging the member against its stop.

2. A vehicle bumper comprising a pair of cross bars clamped together in spaced relation adjacent their ends, separate members being pivoted to each end of each of said bars to swing in a horizontal plane, stops for preventing the end members from swinging toward the vehicle beyond their working positions, and a spring for swinging the members against their stops but permitting a swinging of the members in the opposite direction against the tension of the spring.

3. A bumper for vehicles, comprising a cross bar, a separate member at each end thereof, an end portion of the bar and an end portion of the separate member each being twisted to lie in a plane at right angles to the body of the bar and member and one overlying the other, a pivot member thru said overlying portions whereby said end member may swing relative to the bar and in a direction away from the vehicle, and means for returning the member to its working position.

4. A bumper for vehicles, comprising a cross bar, a separate member at each end thereof, an end portion of the bar and an end portion of the separate member each being twisted to lie in a plane at right angles to the body of the bar and member and one overlying the other, a pivot member thru said overlying portions whereby said end member may swing relative to the bar and in a direction away from the vehicle, and a stop to prevent the member from swinging in one direction beyond its working position.

5. A bumper for vehicles, comprising a cross bar, a separate member at each end thereof, an end portion of the bar and an end portion of the separate member each being twisted to lie in a plane at right angles to the body of the bar and member and one overlying the other, a pivot member thru said overlying portions whereby said end member may swing relative to the bar and in a direction away from the vehicle, a stop to prevent the member from swinging in one direction beyond its working position, and a spring for swinging the member against its stop.

6. A bumper for vehicles, comprising a pair of cross bars clamped together in spaced relation, separate end members at the ends of each of said bars, an end portion at each end of each bar and an end portion of each of the separate members being twisted to lie in a plane at right angles to the body of the bar and the member, with a twisted portion of a member overlying a twisted portion of the bar, pivot members extending thru said overlying portions whereby said end member may swing in a direction away from the vehicle, a stop to prevent the member from swinging in one direction beyond its working position, and a spring for swinging the member against its stop.

In testimony whereof I affix my signature.

JOSEPH A. JACOBS.